United States Patent [19]

Aucoin, Jr. et al.

[11] 4,086,717
[45] May 2, 1978

[54] FISH HANDLING APPARATUS

[76] Inventors: Ano J. Aucoin, Jr.; Rodney Hanks, both of 213 Utah St., Morgan City, La. 70380

[21] Appl. No.: 702,101

[22] Filed: Jul. 2, 1976

[51] Int. Cl.² .............................................. A01K 79/00
[52] U.S. Cl. ...................................................... 43/6.5
[58] Field of Search ...................... 43/4, 6.5, 4.5, 7, 14, 43/102, 103, 104; 56/9; 37/55; 114/49, 245

[56] References Cited

U.S. PATENT DOCUMENTS

| 991,333 | 5/1911 | Lybeck | 56/9 |
|---|---|---|---|
| 1,486,485 | 3/1924 | Frissell | 43/6.5 |
| 1,489,917 | 4/1924 | Blecker | 43/6.5 |
| 2,064,408 | 12/1936 | Blecker | 43/6.5 |
| 3,198,157 | 8/1965 | Livas | 114/49 |

*Primary Examiner*—Russell R. Kinsey
*Assistant Examiner*—Robert P. Swiatek
*Attorney, Agent, or Firm*—Burns, Doane, Swecker & Mathis

[57] ABSTRACT

A fishing apparatus comprises a floating platform and a transfer conveyor mounted at a forward end of the platform. The transfer conveyor extends downwardly and forwardly through a channel formed in the bow of the platform. The barge includes forwardly converging side portions which terminate at this channel. Forwardly extending and laterally spaced support arms are pivotably connected to the platform for up and down swinging movement. Laterally spaced pontoons are secured to forward ends of the support arms. A series of contiguously arranged side nets and floor nets form a forwardly open scoop extending from the pontoons into the mouth of the transfer conveyor for capturing and conducting fish upwardly into the transfer conveyor. Mechanism is connected to the pontoons for selectively varying the ballast thereof to raise and lower the scoop. A series of conveyors are mounted on a working deck of the platform to enable fish from the transfer conveyor to be sorted by workers and then conducted to suitable storage compartments carried by the platform.

8 Claims, 5 Drawing Figures

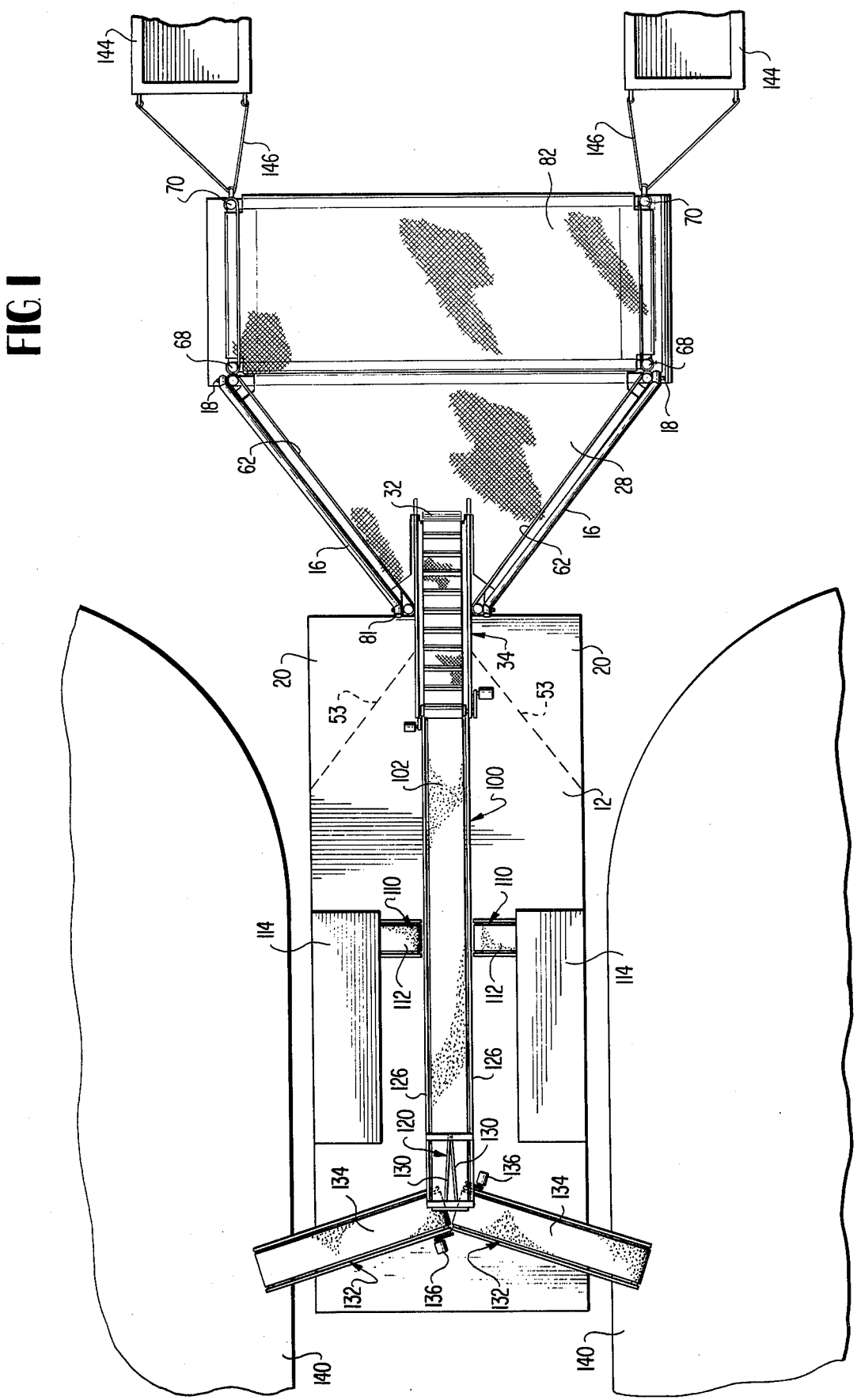

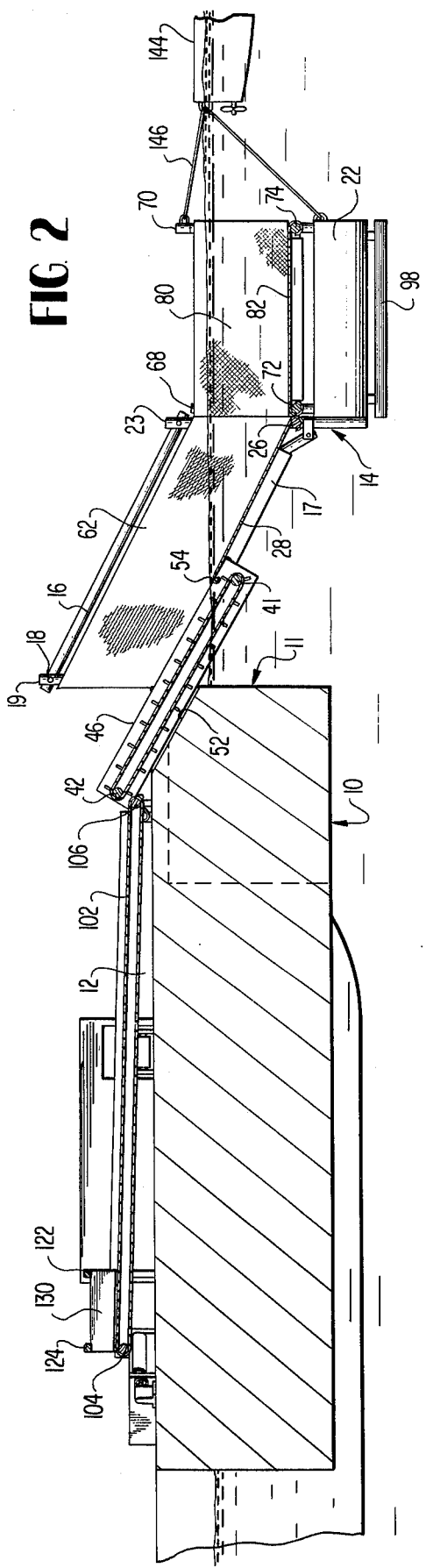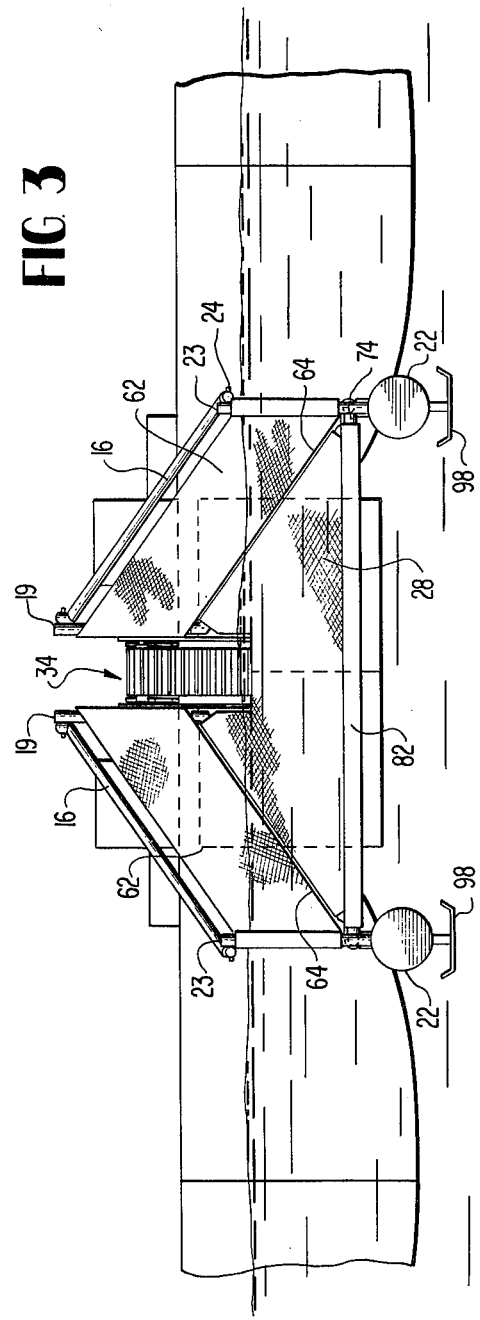

FISH HANDLING APPARATUS

BACKGROUND AND OBJECTS

The invention relates to a fish harvester and, more particularly, to a fishing vessel adapted to capture and land schools of fish.

Fishing vessels have heretofore been proposed for catching schools of fish, as exemplified by the following U.S. Pats. Nos. issued to: Frissell, 1,486,485, on Mar. 11, 1924; Puretic, 3,124,890, on Mar. 17, 1964; and Miller et al., 3,786,592, on Jan. 22, 1974.

Previous proposals have involved disposing a forwardly open cage formed at least partly of netting, at the bow of a vessel. The cage is to be lowered into the water by means of a boom and cable system so that small fish such as shrimp can be contained by the cage as the vessel advances through the water. The fish are then to be conveyed from the cage to the vessel for storage. Once the fish have been brought ashore, they are to be sorted into various categories according to edibility, etc. Importantly, the impractical design of many prior art proposals renders them highly unlikely to achieve significant commercial success.

Besides being of a nature which could impede the attainment of sufficient speed to maximize the size of the catch, many prior proposed vessels may be lacking from a durability standpoint. For example, boom and cable systems can be very vulnerable to damage during storms.

Many prior proposed vessels are also deficient from an efficiency standpoint in that the large-scale capturing of fish larger than shrimp, for example, may not be practicable. Also, considerable time is lost in having to wait until the vessel reaches port before sorting of the fish can be conveniently performed.

It is, therefore, an object of the present invention to provide a novel fish harvesting vessel.

It is another object of the invention to provide a novel fish harvesting vessel which is capable of achieving sufficient speed to maximize the size of a catch.

It is another object of the present invention to provide a novel fish harvesting vessel which is capable of withstanding rough weather.

It is an additional object of the invention to provide a novel fish harvesting vessel which makes possible the mass capture of larger fish.

It is a further object of the invention to provide a novel fish harvesting vessel which facilitates sorting of fish aboard the vessel.

BRIEF SUMMARY

At least some of these objects are achieved by a fishing vessel which includes a floatable platform and a transfer conveyor mounted at the forward end of the platform. The transfer conveyor extends downwardly and forwardly within a channel formed in the bow of he platform. Forwardly converging side portions of the barge terminate at this channel. Pivotally connected to the platform for up and down swinging movement are forwardly extending, laterally spaced support arms. Laterally spaced pontoons are secured to forward ends of the support arms. A series of contiguously arranged side nets and floor nets form a forwardly open scoop extending from the pontoons to the transfer conveyor for capturing fish and conducting such fish upwardly toward the mount of the transfer conveyor. A ballast control mechanism is connected to the pontoons for selectively varying the ballast thereof to raise and lower the scoop. A series of conveyors are mounted on the deck of the platform for receiving fish from the transfer conveyor. This series of conveyors includes a main conveyor positioned so that workers can conveniently sort fish on deck. The series of conveyors also includes conveyors for conveying the sorted fish from the main conveyor to storage compartments carried by the platform.

THE DRAWINGS

Other objects and advantages of the invention will become apparent from the subsequent detailed description thereof in connection with the accompanying drawings in which like numerals designate like elements, and in which:

FIG. 1 is a plan view of a fishing vessel according to the present invention;

FIG. 2 is a longitudinal sectional view of the fishing vessel of FIG. 1;

FIG. 3 is a front view of the fishing vessel of FIG. 1;

DETAILED DESCRIPTION

Figure 4:
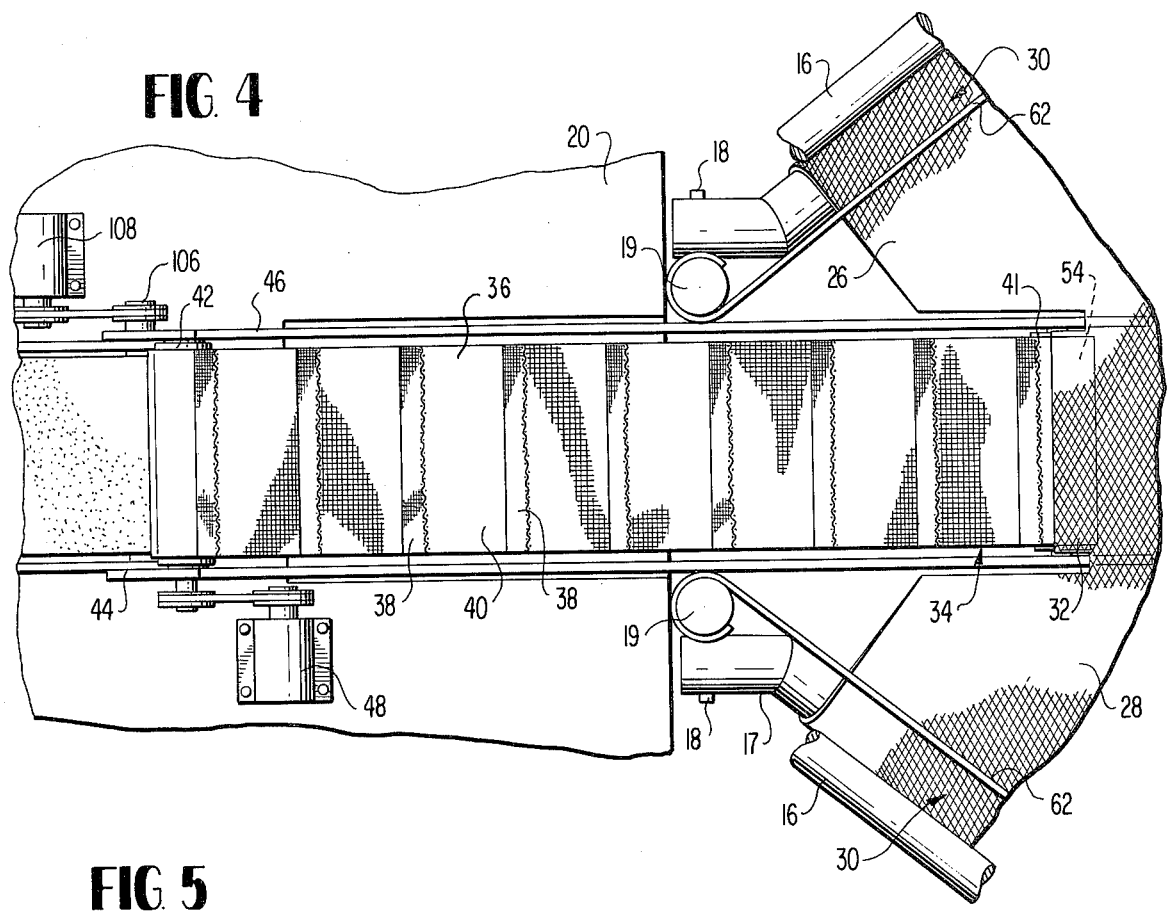
FIG. 4 is a fragmentary plan view of a fish transfer conveyor, with portions of upper support arms of the vessel broken away for clarity.

A preferred form of fish harvesting vessel according to the present invention includes a floatable platform, such as a barge 10, having a bow end 11 and a working deck 12. Extending forwardly from the bow is a fish receiver and transfer assembly 14. The assembly 14 includes laterally spaced pairs of support arms. Each pair of support arms comprises upper and lower superposed support arms 16, 17 which project forwardly and downwardly from the bow of the barge 10. The arms 16, 17 are preferably in the form of hollow cylindrical tubes or bars. At their rearward ends the support arms 16, 17 are secured by horizontal pivot pins 18 to a pair of laterally spaced, upstanding rear posts 19 for vertical pivoting movement. These posts are rigidly fastened to platforms 20 which constitute forward extensions of the working deck.

Connected at the forward ends of the support arms 16, 17 are a pair of pontoons 22. Each pontoon 22 carries an upstanding post 23. Horizontal pivot pins 24 connect the posts 23 to the arms 16, 17. Extending generally horizontally across the rear ends of the pontoons is a cross-bar 26. Secured to the support arms 17 and to the cross-bar 26 is a net 28, which is formed of any suitable perforated material. The net 28 extends forwardly and downwardly from the barge, with the lateral side edges 30 of the net being forwardly convergent. The side edges 30 of the net 28 are wrapped around and suitably fastened to the arms 17 (see FIGS. 4 and 5). A section 32 of the net 28 extends into the entry mouth of a transfer conveyor 34 (FIGS. 1 and 4).

The transfer conveyor 34 comprises an endless wire conveyor belt 36. The belt 36 includes spaced slats 38 which are interconnected by a screen mesh 40, the entire belt assembly being wrapped around a pair of rollers 41, 42 disposed at the front and rear ends, respectively, of the conveyor 34. The rollers 41, 42 are rotatably mounted in bearings situated in opposed guide walls 44, 46 fixed to the bow of the barge 10. The upper roller 42 is power driven by a motor 48 to rotate the conveyor belt 36, with the upper flight of the belt 36 travelling upwardly toward the barge.

The transfer conveyor 34 is downwardly and forwardly inclined relative to the barge (FIG. 2). A downwardly inclined channel 52 is formed in the bow of the barge 10 to receive the conveyor 34. The barge includes forwardly converging side portions 53 which terminate at the channel 52. The side portions 53 extend beneath the deck extensions 20.

The conveyor 34 is positioned so as not to extend an appreciable distance below the water surface during operation (FIG. 2). Preferably, this arrangement is such that only about two slats 38 of the upper conveyor flight are disposed below the water surface.

The section 32 of the net 28 which extends into the mouth of the transfer conveyor 34 is wrapped around a bar 54 mounted in the guide walls 44, 46 above the conveyor belt 36 (FIGS. 2, 4). Thus, the net 28 is tautly carried by the bar 54, the support arms 17, and the bar 26.

Secured to the posts 19, and to the posts 23 are a pair of upright nets 62. Each of the nets 62 has its rear edge portions wrapped around and secured to the posts 19, 23. The posts 23 are disposed below and laterally outwardly of the posts 19, so that the nets 62 diverge in a forward, downward direction. The lower edges 64 of the nets 62 lie above and immediately adjacent the sides 30 of the net 28 and extend parallel thereto (see FIG. 3).

Figure 5:
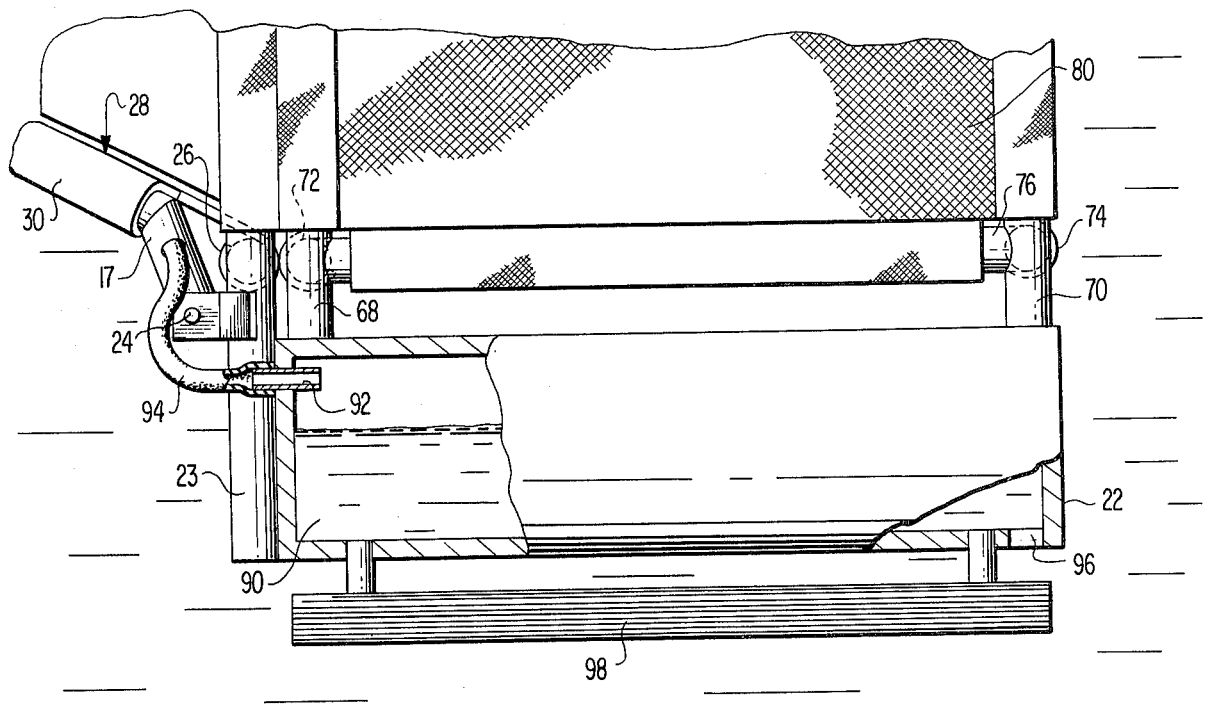
FIG. 5 is a fragmentary side elevational view of a fish-capturing scoop portion of the invention, with sides of the pontoons being broken away for clarity.

Mounted on the pontoons 22 forwardly of the posts 23 is a framework which includes a pair of upstanding rear posts 68 and a pair of upstanding front posts 70. The rear posts 68 are carried by the pontoons 22 (FIG. 5) and are interconnected adjacent their lower ends by a horizontal brace bar 72. Similarly, the front posts 70 are carried by the pontoons 22 (FIG. 5) and are interconnected by a horizontal brace bar 74. Interconnecting the lower ends of adjacent ones of the posts 68, 70 are fore-to-aft extending cross-bars 76 (FIG. 5).

Thus, on each of the pontoons 22 there are mounted a pair of front and rear posts 70, 68 interconnected by a bar 76. An upright net 80 is secured to each pair of posts 68, 70 so as to extend along each pontoon in a fore-to-aft direction from the forward edges of the net 62. The nets 80 have their front edges wrapped around and secured to the posts 70, and their rear edges wrapped around and secured to the posts 68.

A net 82 is connected between the bars 72, 74 by having its front and rear ends wrapped around and secured to these bars 72, 74 (FIG. 2). The net 82 extends forwardly and horizontally from the forward edge of the net 28. The lateral side edges of the net 82 extend parallel to and below the lower edges of the nets 80.

The nets 28, 62, 80 and 82 define a forwardly open scoop at the head of the barge to receive and conduct fish to the mouth of the conveyor 34. The scoop opening is preferably wider than the width of the barge (FIG. 1). The floor of the scoop is defined by the horizontal net 82 and the inclined net 28, these nets being essentially contiguous, with the net 28 being inclined upwardly to the mouth of the conveyor 34. The sides of the scoop are defined by the nets 80 and the nets 62 which are essentially contiguous. The nets 80, 82 form a fish-receiving chamber of the scoop and the nets 62, 28 form an upwardly and rearwardly convergent fish-conducting channel leading from the fish-receiving chamber to the mouth of the conveyor 34.

Control over the operating depth of the scoop is afforded by the pontoons 22. These pontoons include inner chambers 90 which can be selectively ballasted and de-ballasted in any conventional manner (FIG. 5). For example, an inlet fitting 92 can extend through an aperture at the top of each pontoon 22. Air hoses 94, which travel through the arms 17, extend from the barge to the fittings 92. These hoses are connected to a suitable air pump which is operable to supply pressurized air to the chambers 90 for purging water through an outlet 96 to regulate pontoon buoyancy, and hence produce upward or downward movement toward a desired depth. If desired, suitable valving could be disposed at the opening 96 for remote control from the barge, as would be apparent to those skilled in the art. The pontoons are versatile in that by proper ballasting they can overcome any tendency of the arms 16, 17 to pivot downward as might occur under the influence of oncoming water acting upon the pontoons. If desired, other means can be provided to restrain the arms 16, 17 once a proper depth of the scoop is reached.

Stabilizer plates 98 are mounted on the bottoms of the pontoons 22 to dampen the vertical motion of the scoop, and to enable the pontoons to glide over submerged terrain.

Depending upon the depth at which target fish are traveling, the depth of the scoop can be altered for maximum effectiveness by varying the buoyancy of the pontoons 22. Due to the parallelogram mounting of the support arms 16, 17, the scoop remains at an essentially level orientation at all elevations. The pontoons can be actuated without cumbersome boom-cable structures that can interfere with on-deck activities. Fish entering the scoop are conducted to the conveyor 34 and thereafter onto the deck 12.

Disposed upon the deck 12 is a network of conveyors which enable fish to be sorted as to size, species, edibleness, etc., before being stored. In this regard, a main conveyor 100 is situated fore-to-aft along the deck 12. This main conveyor includes an endless belt 102 suitable for conveying fish longitudinally along the deck 12. The conveyor belt 102 is wrapped around guide rollers 104, 106, the roller 106 being driven by a motor 108 to rotate the belt 102 (FIG. 4). The belt 102 is of a length suitable for enabling laborers to be positioned therealong to sort fish. The conveyor belt 102 is slightly inclined upwardly in a rearward direction to assure that water is discharged from the front of the belt 102.

Branching from the main conveyor 100 are a pair of branch conveyors 110 having endless, power driven belts 112 for conveying fish to storage compartments 114. Fish can be deposited onto the conveyor belts 112 by hand during the sorting operation. The storage compartments 114 might comprise removable freezers that can be lifted onto and from the barge by cranes or the like.

At the rear end of the main conveyor 100 there is situated a divider member 120. This divider member is mounted on a pair of inverted U-shaped frame supports 122, 124 that are fastened to stationary side plates 126 of the main conveyor 100. The divider member 120 includes rearwardly diverging plates 130 which terminate above a take-off conveyors 132. These take-off conveyors 132 each include a belt 134 driven by a motor 136. Fish which bypass the branch conveyors 110 are directed by the divider plates 130 to one or the other of the take-off conveyors and are delivered to one of a pair of storage units 140 which are situated alongside the barge 10. These storage units can comprise separate floating compartments which are able to return to port when filled to allow fishing operations to be continued.

While the barge can be self-propelled, it is preferable that it be towed or pushed by separate, powered vessels. For example, a pair of self-propelled towing vessels 144 can be hitched by tow lines 146 to the posts 70 and the pontoons 22. These vessels 144 are disposed laterally of the scoop so as not to interfere with fishing activities.

OPERATION

In operation, the scoop is lowered to a desired fishing depth by appropriate flooding of the pontoons. During upward or downward movement, the pontoons, and thus the net 82, remain in an essentially horizontal condition due to the parallelogram arrangement of the support arms 16, 17 and the posts 19, 23 which tend to maintain the posts 23 upright. The vessels 144 tow the barge through a school of fish so that large numbers of the fish enter the front of the scoop. These captured fish are confined from beneath by the nets 82, 28, and along the sides by the nets 80, 62. As the barge continues to advance, these fish are directed upwardly between the nets 28, 62 and eventually enter the mouth of the conveyor 34. It should be noted that the nets 62 or portions thereof, can be directed as shown, or can be so arranged to converge toward the front of the conveyor plates 46, rather than toward the posts 19. Since the conveyor 34 extends only a slight distance into the water, it presents only minimal obstruction to advancement and maneuvering of the barge. Since the nets are perforated, they present minimum obstruction to barge travel.

The forwardly converging nature of the sides of the barge allows the oncoming water to flow past the barge, allowing the barge to attain greater speed. In this fashion, the size of the catch can be maximized.

Importantly, in the event that a storm arises, the pontoons 22 can be ballasted sufficiently to submerge most of the fish transfer assembly 14. This arrangement provides maximum safety in that there are no boom or cable structures aboard the vessel which are subject to damage, or which can constitute a safety hazard.

The absence of boom-cable apparatus for actuating the scoop also leaves the deck relatively free of obstructions during normal activities.

The overall arrangement whereby a plurality of side nets and floor nets are contiguously arranged, enables a larger scoop to be employed than would likely be possible otherwise, thereby maximizing the size of the catch.

The conveyor system aboard the barge enables fish to be sorted as the vessel engages in fishing operations and returns to port, thereby saving considerable time.

It will be realized that the present invention enables large scale fishing operations to be conducted in a highly efficient and safe manner.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:
1. Fishing apparatus comprising:
a floatable platform;
a transfer conveyor mounted at a forward end of said platform and extending downwardly and forwardly therefrom;
forwardly extending, laterally spaced support arms pivotably connected adjacent the forward end of said platform for up and down swinging movement;
laterally spaced pontoons secured to forward ends of said support arms, said pontoons each including an inner chamber;
net means forming a forwardly open scoop extending from said pontoons to said transfer conveyor for capturing fish and conducting such fish upwardly toward a mouth of said transfer conveyor; and
means connected to said pontoons for selectively varying the buoyancy thereof to raise and lower said scoop relative to said platform.

2. Apparatus according to claim 1 wherein said net means includes sections defining a floor and sides of said scoop, said floor extending into the mouth of said transfer conveyor.

3. Apparatus according to claim 2 wherein said floor includes a generally horizontal front portion extending between said pontoons, and a rear portion inclined upwardly from said front portion toward said transfer conveyor.

4. Apparatus according claim 1 wherein said support arms comprise two laterally spaced pairs of vertically spaced, parallel arms connected between said platform and said pontoons for maintaining said pontoons horizontally disposed.

5. Apparatus according to claim 1 and further including a main conveyor disposed upon a working deck of said platform and extending in a fore-to-aft direction; a front end of said main conveyor being located for receiving fish from a rear end of transfer conveyor; said main conveyor extending in a generally fore-to-aft direction and positioned to enable workmen disposed alongside thereof to sort fish being fed rearwardly therealong; storage compartment carried by said platform for receiving fish; and means for conveying fish from said main conveyor to said storage compartment.

6. Apparatus according to claim 1 wherein said support arms include at least two laterally spaced arms; a first pair of upstanding posts carried by said platform on opposite sides of said transfer conveyor; the rear ends of said arms being connected to said first posts; a second pair of upstanding posts carried by said pontoons; said arms being connected at their front ends to said second posts; a first cross-bar extending between lower ends of said second posts; said pontoons each carrying front and rear upstanding posts; a brace bar interconnecting lower ends of said front and rear posts; second and third horizontal cross-bars extending between lower ends of the front posts and the rear posts, respectively; said net means comprising: a first pair of vertical nets each being connected between the front and rear posts of respective ones of said pontoons, a second pair of vertical nets connected between said first and second pairs of posts, a horizontal net connected between said second and third cross-bars, and an inclined net connected between said first cross-bar, and said support arms; said horizontal net and said inclined net defining a floor of said scoop and said first and second pairs of vertical nets defining sides of said scoop.

7. Apparatus according to claim 1, wherein said means connected to said pontoons comprises an air hose extending longitudinally within a support arm from said platform to said pontoons.

8. Fishing apparatus comprising:
a floatable platform;

a transfer conveyor mounted at a forward end of said platform and extending downwardly and forwardly therefrom;

means forming a multi-sectioned fish receiving scoop extending forwardly from said platform for directing fish toward said conveyor, said fish receiving scoop comprising:

a forward section including first frame means, netting connecting to said first frame means forming a forwardly open fish receiving portion of said scoop including floor and sides, and pontoons connected to said frame means, each pontoon including an inner chamber;

an inclined section including second frame means having a forward end and a rearward end disposed above said forward end, and netting connected to said second frame means forming continuations of the floor and sides of said forward section, said forward end of said second frame means being connected to a rearward end of said first frame means by means providing relative vertical swinging movement therebetween, said rearward end of said second frame means being carried by a third frame means disposed adjacent the forward end of said platform by means providing relative vertical swinging movement therebetween, so that said inclined section is vertically swingable relative to said forward section and relative to said platform; and means connected to said pontoons for selectively adjusting the buoyancy thereof to raise and lower said scoop in water, while said forward section maintains a substantially constant orientation relative to horizontal by swinging vertically relative to said inclined section.

* * * * *